United States Patent [19]
Hoy et al.

[11] 4,130,523
[45] Dec. 19, 1978

[54] HIGH SOLIDS LATEXES

[75] Inventors: Kenneth L. Hoy; Roland H. Peterson, both of St. Albans, W. Va.

[73] Assignee: Union Carbide Corporation, New York, N.Y.

[21] Appl. No.: 816,472

[22] Filed: Jul. 18, 1977

[51] Int. Cl.² .............................................. C08L 31/02
[52] U.S. Cl. ....................... 260/29.6 R; 260/29.6 PT; 260/29.6 H
[58] Field of Search ................. 526/67, 80; 260/29.6 R

[56] References Cited
U.S. PATENT DOCUMENTS

| 3,318,831 | 5/1967 | Garislaa | 260/29.6 R |
| 3,424,706 | 1/1969 | Smith et al. | 260/29.6 R |
| 3,637,563 | 1/1972 | Christena et al. | 260/29.6 R |

FOREIGN PATENT DOCUMENTS

| 876023 | 8/1961 | United Kingdom | 526/67 |
| 1191649 | 5/1970 | United Kingdom. | |

Primary Examiner—Lewis T. Jacobs
Attorney, Agent, or Firm—Peter R. Shearer

[57] ABSTRACT

Aqueous polymer latexes having total solids contents of nearly 70 volume percent or more are produced by a process in which a portion of a forming latex in a reaction zone is continuously withdrawn from the reaction zone during formation of a stable seed latex and an intermediate latex, and the withdrawn latex is continuously fed back to the reaction zone during the formation of the final latex.

14 Claims, No Drawings

HIGH SOLIDS LATEXES

BACKGROUND OF THE INVENTION

Aqueous latexes of a variety of homopolymers and copolymers have been known in the art for many years. Among the polymers which are useful in producing aqueous latexes one can mention homo- and copolymers of acrylate monomers such as alkyl acrylates and alkyl methacrylates; vinyl esters such as vinyl acetate; vinyl or vinylidene halides such as vinyl chloride and vinylidene chloride; acrylonitrile; isoprene; chloroprene; butadiene; isobutylene; and styrene. These monomers are mentioned as being merely illustrative and not all-inclusive of monomers useful in the production of aqueous latexes.

The aqueous latexes are produced by the well known techniques of emulsion polymerization. Generally, emulsion polymerization involves the addition of the monomer or omomers to be polymerized to a stirred aqueous reaction medium which contains a surfactant or emulsifying agent. Additionally, a polymerization catalyst or initiator is employed which may be partially or completely added to the medium prior to the introduction of the polymerizable monomer or monomers.

The aqueous polymer latexes are stable and valuable articles of commerce, being widely employed, for example, in the field of paints, coatings, adhesives, and sealants. The aqueous polymer latexes of acrylic monomers, particularly homopolymers of lower alkyl acrylates or copolymers of lower alkyl acrylates with other comonomers such as styrene, alkyl methacrylates, higher alkyl acrylates, acrylic or methacrylic acid, vinyl halides and vinylidene halides, and the like, have become especially widely used in recent years in the production of water-based paints.

In recent years, considerable effort has been expended toward obtaining so-called "high solids" latexes, that is, latexes having a high concentration ratio of polymer to water. Generally, it is more meaningful to discuss the solids content of latexes in terms of volume percent solids than weight percent solids. The theoretical maximum amount of polymer one can have in a latex and still have a fluid is dictated by volumetric limitations, that is, it is a matter of efficiency of polymer particle packing. Since different polymers vary in density, latexes of different polymers may have considerably different weight percent solids contents even though they have the same efficiency of polymer particle packing, that is, the same volume percent solids content. Thus, the maximum volume percent solids content of a latex is essentially the same for all polymers, whereas a given weight precent solids content which constitutes a relatively high solids content for one particular polymer may constitute a relatively low solids content for a different polymer of higher density. In the past twenty years the solids content of commercially produced latexes has been increased from about 40 to about 60 volume percent. However, the industry still desires to achieve higher solids contents, on the order of 70 volume percent or more, in aqueous latexes.

High solids contents are considered desirable because they reduce shipping and storage costs, allow increased productivity of plant equipment, reduce drying time for applied latexes, and allow the application of films of any desired thickness in fewer passes. Moreover, coating and paint formulators who add pigments to the aqueous latexes prefer to have as much of the water which will be in the final formulation available for use in the pigment dispersion as is possible.

Those skilled in the art know that particles of varying size can be packed more efficiently on a volumetric basis than particles of a single size. Latex containing polymer particles having a variety of particle sizes are referred to as "polydisperse" latexes. However, a process which produces a polydisperse latex does not necessarily guarantee high solids content. For example, a polydisperse latex can be prepared by separately producing two or more "monodisperse" latexes of different polymer particle size and blending the latexes thus produced. While polydispersity is achieved, the advantages of more efficient particle packing are not realized because no reduction in water content accompanies latex blending.

Ideally, a process for producing a high solids latex should achieve two objectives:

it should provide for the production of polymer particles of broad size distribution which distribution is carefully controllable by the operator; and it must obtain the desired distribution in a manner which practices strict water economy, that is, the process must employ a minimum of water so that the packing efficiency which is possible with particles of broad size distribution is fully realized.

While recent improvements in latex production processes have increased somewhat the solids contents obtainable in aqueous latexes, none of the processes completely achieves both the foregoing objectives, as a result of which aqueous latexes have not been consistently produced above about 60–65 volume percent solids.

U.S. Pat. No. 3,637,563 discloses a method for increasing the solids content of an aqueous latex by forming a pre-emulsion comprising a continuous phase of monomer having a discontinuous phase of about 6–25 wt.% water therein and continuously feeding the pre-emulsion to an equeous reaction medium containing a polymerization catalyst. This process achieves certain economies in the consumption of water, but the polymer particle size distribution is essentially limited to the naturally occurring distribution.

Great Britain patent No. 1,191,649 claims a method of producing a high solids latex which entails carrying out the emulsion polymerization to about 50–90% completion in the presence of a bare minimum of catalyst and surfactant and then adding surfactant and catalyst before completing polymerization. This process results essentially in a "bimodal" particle size distribution, which provides for somewhat more efficient particle packing than a monodisperse latex, however, it does not provide a broad controlled particle size distribution which optimizes particle packing efficiency.

U.S. Pat. No. 3,424,706 discloses a process for producing "polydisperse" latexes of polyvinylidene chloride in which several incremental additions of a preformed seed latex are made to the reaction mixture during the polymerization reaction. Essentially, the effect of this process is to produce a latex having particles of several discreet size ranges, each particle size corresponding to one of the incremental additions of monomer. It is said, at Col. 6, lines 3–4 therein that the addition of seed latex can be continuous. This patent provides a significantly broader distribution of polymer particle sizes than the preceding art, however, it does so at the expense of water economy. In this patent, a monodisperse seed latex is added to the reaction mixture during polymerization. Generally, seed latexes are about 10 to 20 volume percent solids. In Example 1 of U.S. Pat. No. 3,424,706, the seed latex is 20 weight percent solids (about 15 volume percent, based on the density of polyvinylidene chloride). This means that for every volume unit of new seed latex particles added to the reactor during the reaction, 5 to 6 additional volume units of water must be added to the reactor.

SUMMARY OF THE INVENTION

We have now discovered a process for producing high solids aqueous polymer latexes having total solids contents as high as 70 volume percent and higher, and having viscosities well within the useful range. In the process of this invention, monomers are emulsion polymerized in such a way that the latex produced contains a wide carefully controlled distribution of particle sizes. Further, the wide, carefully controlled distribution of particle sizes is obtained using a minimum of water, so that efficient volumetric packing (i.e. high solids) is obtained.

In the process of this invention, during the formation of a seed latex and then an intermediate latex, a portion of the latex forming in the reactor is continuously being withdrawn and stored. The withdrawn latex is then continuously fed back to the reactor during the final stage of the polymerization.

DETAILED DESCRIPTION OF THE INVENTION

In particular, the process of this invention comprises the steps of:

(a) initiating latex formation by feeding an emulsion polymerizable monomer to an aqueous polymerization medium in a reaction zone, said aqueous polymerization medium containing a sufficient amount of a polymerization catalyst to initiate polymerization of the monomer;

(b) forming a stable seed latex by continuing to feed said emulsion polymerizable monomer to the reaction zone and simultaneously feeding to the reaction zone a polymerization catalyst and an emulsion stabilizing amount of a surfactant and buffer;

(c) forming an intermediate latex by continuing to feed said emulsion polymerizable monomer to the reaction zone and simultaneously feeding to the reaction zone a catalyst and an emulsion stabilizing amount of a surfactant and buffer;

(d) during steps (b) and (c) continuously withdrawing a portion of the latex being formed from the reaction zone to a storage zone, the withdrawal of latex from the reaction zone and formation of intermediate latex in the reaction zone being conducted until the intermediate latex in the reaction zone has a solids content of from about 55 to 65 volume percent, preferably from about 58 to about 63 volume percent; and then (e) forming a final latex by continuing to feed said emulsion polymerizable monomer to the reaction zone and simultaneously continuously feeding the withdrawn latex to the reaction zone to form a final latex having a solids content of at least greater than 65 volume percent.

The distinguishing feature of the polymerization process of this invention which results in the production of high solids latexes having essentially infinite variation in particle sizes within a fixed range is the continuous withdrawal of a portion of the forming latex during the formation of the seed latex and the intermediate latex, and the subsequent continuous feedback of the withdrawn latex to the reaction zone during final latex formation. The withdrawn latex which is subsequently fed back to the reaction zone during final latex formation contains polymer particles of continuously varying size from the smallest initiated particles present in the reaction zone at the beginning of seed latex formation to the largest particles present in the reaction zone at the end of intermediate latex formation. As the withdrawn latex particles of continuously varying size are continuously fed back to the reaction zone wherein they become admixed with polymer particles of larger size, they begin to grow larger with the continued addition of monomer, yet the continuous variation in size among the polymer particles is maintained with the result that high solids are achieved in the final latex without undesirably high viscosity.

An important feature of this process is that, because the withdrawn latex is withdrawn continuously during seed latex formation and intermediate latex formation, the withdrawn latex in the storage zone is itself a broad size distribution polydisperse latex of relatively high solids content by comparison to the seed latex which is added to the reaction mixture in U.S. Pat. No. 3,424,706. Consequently, a minimum amount of water is added to the reactor when the withdrawn latex is fed back to the reactor during final polymerization. The final latex thus contains a broad controlled particle size distribution in a minimum amount of water.

The reaction zone is any reactor, properly equipped, that can be used in the carrying out of emulsion polymerization reactions. The different types of reactors and their suitability for emulsion polymerizations are well known to those skilled in the art. Typically, a stirred tank with means for controlling temperature and pressure, means for providing a continuous feed of the monomer, catalyst, surfactant, buffer, etc., means for continuously withdrawing a portion of the tank's contents, and, where desired, means for providing an inert atmosphere (e.g. $N_2$) above the reactants, is suitably employed as the reaction zone.

The emulsion polymerizable monomers which are useful in the process of our invention are any of the monomers having at least one olefinically unsaturated group of the formula

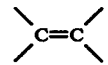

which are known to those skilled in the art to undergo addition polymerization under the conditions of emulsion polymerization in an aqueous medium. These monomers are so well known to those skilled in the art as to require no further elaboration herein. Nonetheless, one can mention as illustrative thereof, unsaturated compounds such as ethylene, propylene, 1-butene, 2-butene, isobutylene, 1-pentene, 2-methyl-2-butene, 1-hexene, 4-methyl-1-pentene, 3,3-dimethyl-1-butene, 2,4,4-trimethyl-1-pentene, 6-ethyl-1-hexene, 1-heptene, 1-octene, 1-decene, 1-dodecene, allene, butadiene, isoprene, chloroprene, 1,5-hexadiene, 1,3,5-hexatriene, divinylacetlyene, cyclopentadiene, dicyclopentadiene, norbornene, norbornadiene, methylnorbornene, cyclohexene, styrene, alpha-chlorostyrene, alpha-methylstyrene, allylbenzene, phenylacetylene, 1-phenyl-1, 3-butadiene, vinylnaphthalene, 4-methylstyrene, 2,4-dimethylstyrene, 3-ethylstyrene, 2,4-diethylstyrene, 2-methoxystyrene, 4-methoxy-3-methylstyrene, 4-chlorostyrene, 3,4-dimethyl-alpha-methylstyrene, 3-bromo-4-methyl-alpha-methylstyrene, 2,5-dichlorostyrene, 4-fluorostyrene, 3-iodostyrene, 4-cyanostyrene, 4-vinylbenzoic acid, 4-acetoxystyrene, 4-vinyl benzyl alcohol, 3-hydroxystyrene, 1.4-dihydroxystyrene, 3-nitrostyrene, 2-aminostyrene, 4-N,N-dimethylaminostyrene, 4-phenylstyrene, 4-chloro-1-vinylnaphthalene, acrylic acid, methacrylic acid, acrolein, methacrolein, acylonitrile, methacrylonitrile, acrylamide, methacrylamide, methyl acrylate, methyl methacrylate, norbornenyl acrylate, norbornyl diacrylate, 2-hydroxyethyl acrylate, 2-phenoxyethyl acrylate, trimethoxysilyloxypropyl acrylate, dicyclopentenyl acrylate, cyclohexyl acrylate, 2-tolyloxyethyl acrylate, N,N-dimethylacrylamide, isopropyl methacrylate, ethyl acrylate, methyl alpha-chloroacrylate, betadimethylaminoethyl methacrylate, N-methyl methacrylamide, ethyl methacrylate, 2-ethylhexyl acrylate, neopentyl glycol diacrylate, cyclohexyl methacrylate, beta-bromoethyl methacrylate, benzyl methacrylate, phenyl methacrylate, neopentyl methacrylate, butyl methacrylate, chloroacrylic acid, methyl chloroacrylic acid, hexyl acrylate, dodecyl acrylate, 3-methyl-1-butyl acrylate, 2 -ethoxyethyl acrylate, phenyl acrylate, butoxyethoxyethyl acrylate, 2-methoxyethyl acrylate, isodecyl acrylate, pentaerythritol triacrylate, methoxy poly(ethyleneoxy)$_{12}$ acrylate, tridecoxy poly(ethyleneoxy)$_{12}$ acrylate, chloroacrylonitrile, dichloroisopropyl acrylate, ethacrylonitrile, N-phenyl acrylamide, N,N-diethylacrylamide, N-cyclohexyl acrylamide, vinyl chloride, vinylidene chloride, vinylidene cyanide, vinyl fluoride, vinylidene fluoride, trichloroethene, vinyl acetate, vinyl propionate, vinyl butyrate, vinyl benzoate, vinyl butyral, vinyl propionate, vinul chloroacetate, isopropenyl acetate, vinyl formate, vinyl methoxyacetate, vinyl caproate, vinyl oleate, vinyl adipate, methyl vinyl ketone, methyl isopropenyl ketone, vinyl phenyl ketone, methyl alpha-chlorovinyl ketone, ethyl vinyl ketone, divinyl ketone, allylidene diacetate, methyl vinyl ether, isopropyl vinyl ether, butyl vinyl ethers, 2-ethylhexyl vinyl ether, 2-methoxyethyl vinyl ether, 2-chloroethyl vinyl ether, methoxyethoxy ethyl vinyl ether, hydroxyethyl vinyl ether, aminoethyl vinyl ether, alpha-methylvinyl methyl ether, divinyl ether, divinyl ether of ethylene glycol or diethylene glycol or triethanolamine, cyclohexyl vinyl ether, benzyl vinyl ether, phenethyl vinyl ether, cresyl vinyl ether, hydroxyphenyl vinyl ether, chlorophenyl vinyl ether, napthyl vinyl ether, dimethyl maleate, diethyl maleate, di-(2-ethylhexyl) maleate, maleic anhydride, dimethyl fumarate, dipropyl fumarate, diamyl fumarate, vinyl ethyl sulfide, divinyl sulfide, vinyl p-tolyl sulfide, divinyl sulfone, vinyl ethyl sulfone, vinyl ethyl sulfoxide, vinyl sulfonic acid, sodium vinyl sulfonate, vinyl sulfonamide, vinyl benzamide, vinyl pyridine, N-vinyl pyrollidone, N-vinyl carbazole, N-(vinyl benzyl)-pyrrolidine, N-(vinyl benzyl) piperidine 1-vinyl pyrene, 2-isopropenyl furan, 2-vinyl dibenzofuran, 2-methyl-5-vinyl pyridine, 3-isopropenyl pyridine, 2-vinyl piperidine, 2-vinyl quinoline, 2-vinyl benzoxazole, 4-methyl-5-vinyl thiazole, vinyl thiophene, 2-isopropenyl thiophene, indene, coumaraone, 1-chloroethyl vinyl sulfide, vinyl 2-ethoxyethyl sulfide, vinyl phenyl sulfide, vinyl 2-naphthyl sulfide, allyl mercaptans, divinyl sulfoxide, vinyl phenyl sulfoxide, vinyl chlorophenyl sulfoxide, methyl vinyl sulfonate, vinyl sulfoanilide, and the like.

The catalysts, surfactants, buffers, and any other constituents which can be employed in the emulsion polymerization reaction mixture in the process of this invention are the same as those which can be employed in the known emulsion polymerization processes of the prior art. The particular choice of these materials to be employed does not constitute the invention and is a matter of routinism in the art of emulsion polymerization.

The catalyst employed is typically a free radical initiator or a redox catalyst. One can mention, as merely illustrative of suitable catalysts which can be employed, free radical initiators such as hydrogen peroxide, peracetic acid, t-butyl hydroperoxide, di-t-butyl peroxide, dibenzoyl peroxide, benzoyl hydroperoxide, 2,4-dichlorobenzoyl peroxide, 2,5-dimethyl-2,5-bis(hydroperoxy)hexane, perbenzoic acid, t-butyl peroxypivalate, t-butyl peracetate, azo-bis-isobutylonitrile, ammonium persulfate, sodium persulfate, potassium persulfate, sodium perphosphate, potassium perphosphate, isopropyl peroxycarbonate, etc; and redox catalyst systems such as sodium persulfate-sodium formaldehyde sulfoxylate, cumene hydroperoxide-sodium metabisulfite, hydrogen peroxide-ascorbic acid, sulfur dioxide-ammonium persulphate, etc.

The catalysts are employed in the usual catalytically effective concentrations which are known to those skilled in the art of emulsion polymerization.

Any of the surfactants commonly employed in emulsion polymerization processes of the prior art can be used as the surfactant in the process of this invention. Illustrative of suitable surfactants one can mention the anionic surfactants such as potassium caprylate, potassium myristate, potassium palmitate, potassium stearate, potassium oleate, sodium decyl sulfonate, sodium dodecyl sulfonate, sodium tetradecyl sulfate, sodium decyl sulfate, sodium lauryl sulfate, potassium dehydroabietate, sodium rosinate, alkyl sodium sulfosuccinate esters, and the like; cationic surfactants such as the long chain quaternary amine salts; and nonionic surfactants such as ethylene oxide condensates of oleyl alcohol, cetyl alcohol, lauryl alcohol etc., ethylene oxide condensates of linoleic acid, lauric acid, ricinoleic acid, caproic acid, etc., block copolymers of ethylene oxide and propylene oxide and the ethylene oxide condensates of octyl phenol or nonyl phenol.

In the process of this invention latex initiation is performed in accordance with the procedures known in the art. The aqueous reaction medium is charged to the reaction zone and the monomer or monomers to be polymerized are thereafter fed continuously to the aqueous medium in the reaction zone together with a catalyst and, if desired, surfactant, buffer, etc. By the term "aqueous reaction medium" is meant water plus any other constituents, e.g. catalyst, surfactant, buffer, etc., which are present in the reaction zone in which the polymerization of this process is carried out. The temperature of initiation varies depending, inter alia, on the type of monomers used and the amount and type of catlyst used, and those skilled in the art will know the correct initiation temperature for any given system. Typically, when polymerizing lower alkyl acrylate or methacrylate monomers, e.g. methyl methacrylate, n-butyl acrylate, etc., it is preferred to initiate polymerization at a temperature of from about 40 to about 85° C. depending on the catalyst employed.

The skilled worker in the art will recognize that the number of polymer particles in the final latex—which in turn is determinative of final polymer particle size—is substantially determined during the initiation step and further, that it is affected by the amount of surfactant present during initiation. From the standpoint of producing a latex having a high solids content we prefer that the largest particles in the final latex have a particle diameter of from about 0.4 to about 1.5$\mu$. To the end of producing the desired size of latex particles, it is preferred that the initiation step in the process of this invention be carried out in the absence of surfactant or with only a small amount of surfactant present in the aqueous polymerization medium, preferably not more than 0.03% surfactant, based on the total weight of monomer to be fed to the aqueous medium during the entire process. If used during the initiation step, the surfactant can be present in the aqueous medium which is initially charged to the reaction zone or it can be continously fed to the aqueous medium in the reaction zone together with the monomer or monomers. Those skilled in the art will recognize that a buffer is customarily employed in emulsion polymerization processes in order to control the pH of the reaction mixture and thereby improve emulsion stability and, in some instances, prevent monomer hydrolysis. Suitable buffers are well known to those skilled in the art. Also known are the concentrations at which they are effectively employed. It is to be understood that the feeding of buffer, catalyst, and surfactant to the reaction zone in our process is to be employed as needed to maintain the conditions in the reaction zone which are known to promote continued polymerization of the monomers. Thus, one may periodically discontinue feeding one or more of these components to the reaction zone and still be within the scope of our invention. It is well within the ability of the skilled individual to control the flow of buffer, catalyst and surfactant to the reaction zone so as to maintain the desired polymerization conditions.

The initiation step is carried out until a substantially fixed number of polymer particles is formed in the aqueous medium; that is, the initiation step is complete at the point at which the continued addition of monomer results essentially exclusively in the growth of existing initiated (i.e. growing) polymer particles rather than the establishment of new polymer particles.

Usually, the completion of the initiation step is characterized by the appearance of a bluish tint in the reaction mixture due to the formation of small particles.

As used herein the term "seed latex" refers to a latex wherein the polymer particles are of small size, that is, from about 0.5$\mu$ to about 0.25$\mu$, which are intended for further polymerization to a larger size in the final latex. The seed latex formation step of our process is performed, after the latex initation step, by continuously feeding to the reaction zone the emulsion polymerizable monomer or monomers and simultaneously feeding to the reaction zone the catalyst, buffer, and surfactant. During the seed latex formation and the subsequent steps of the process, the surfactant is fed to the reaction zone in an amount sufficient to stabilize the emulsion, that is, to prevent the emulsion from breaking. Those skilled in the art will know the suitable, effective concentrations of surfactant which will stabilize the emulsion.

Care must be taken during seed latex formation to feed the monomers to the reaction zone at a relatively slow, constant feed rate, since fast or erratic feed rates produced violent, abrupt exotherms which were followed by coagulation of the latex. It is preferred to feed the monomers at a rate which does not exceed about 0.25 to 0.5 wt. % of the total monomers feed per minute. We have found that a stable seed latex is usually formed after about 10 wt. % of the monomers have been fed to the reaction zone.

The intermediate latex formation step is performed in essentially the same manner as the seed latex formation step except that a higher feed rate of monomer is possible, which is more desirable from a commercial production standpoint. In the intermediate latex formation step, monomer feed rates as high as about 1.5 wt. % of the total monomer feed per minute are possible.

As previously mentioned, the intermediate latex formation and latex withdrawal are continued until the latex in the reaction zone has a solids content of from 55 to 65 volume percent, preferably from 58 to 63 volume percent.

Withdrawal of the forming latex in the reaction zone need not necessarily commence precisely at the same time as the seed latex formation step or end precisely at the same time as the intermediate latex formation step, however, it is preferred that it do so in order to obtain a broad distribution of polymer particle sizes in the final latex. The withdrawal is continuous, however, the rate of withdrawal may be varied at the will of the operator so as to produce a "tailored" distribution of polymer particle sizes in the final latex.

We prefer to withdraw the forming latex from the reaction zone at a rate approximately equal to or somewhat less than the rate of feed of material into the reaction zone. In no case, however, should the rate of withdrawal exceed the feed rate for a substantial length of time, as this could cause the reactor to run dry.

The withdrawal of latex from the reaction zone can be achieved by any convenient means. For example, a pipe or tube can be inserted directly into the reaction zone and the latex removed through the pipe or tube by means of a pump.

The storage zone is any suitable container for holding the withdrawn latex. No special storage conditions are required, however, we prefer to store the withdrawn latex in an inert atmosphere, such as nitrogen, to insure that oxygen is not dissolved in the withdrawn latex and later carried back into the reaction zone where it could inhibit polymerization. In some instances, it is desirable to maintain the withdrawn latex below the polymerization temperature in order to keep the catalyst active. During the storage of the withdrawn latex prior to feeding it back to the reaction zone, surfactant can be added to the withdrawn latex to maintain the latex in a stable, emulsified state.

After the intermediate latex formation step has been completed, the final latex formation step is begun. During the final latex formation step no catalyst, surfactant or buffer feed to the reaction zone is usually needed, since the catalyst, surfactant and buffer that is contained in the withdrawn latex that is fed back to the reaction zone is usually sufficient to maintain polymerization conditions. The feeding of the withdrawn latex to the reaction zone need not begin precisely at the commencement of the final latex formation step and need not be precisely coterminous therewith. That is, there may be a short period at the beginning or end of the final latex formation step when monomer is being fed to the reaction zone and no withdrawn latex is being fed to the reaction zone. From the standpoint of producing a final latex having a broad distribution of polymer particle sizes, it is preferred that the feedback of withdrawn latex to the reaction zone commence essentially concurrently with the commencement of final latex formation and terminate essentially concurrently with the termination of final latex formation. The feeding of the withdrawn latex to the reaction zone is continuous, however, the rate of feed may be varied at the will of the operator.

The temperature of reaction in the process of our invention is any temperature at which the monomer or monomers employed undergo emulsion polymerization in the presence of an active initiator or catalyst. Such temperatures vary with the particular monomer or monomers and catalyst systems employed and those skilled in the art will know the appropriate temperature of reaction for any given system. Typically, the reaction temperature is from 30° to 95° C.

In addition to the constituents mentioned herein, there can also be added to the reaction zone during the process of this invention any other constituents which are known to those skilled in the art to beneficially promote the emulsion polymerization process such as, for example, the so called "secondary" emulsifiers or surfactants (see, e.g., "Emulsion Polymerization", *Encyclopedia of Polymer Science and Technology* Vol. 5, Interscience Publishers, 1966, for typical constituents of emulsion polymerization reaction mixtures.)

Throughout the process of this invention the latex in the reaction zone and the withdrawn latex being stored prior to feeding it back to the reaction zone preferably undergo efficient mixing. This mixing assures that the desired distribution of particle sizes is obtained in the final latex.

It is preferred that the rate of feed of monomers to the reaction zone not exceed the rate of reaction for any substantial length of time during the process of this invention, since the buildup of unreacted monomer in the reaction zone can cause instability of the emulsion.

The latexes produced by the process of this invention exhibit high solids content, in excess of 65 volume percent and sometimes in excess of 70 volume percent, and viscosities such that they can be easily applied to substrates by means of conventional techniques employed in the paints and coatings industries, e.g., spraying, brushing, rolling, doctor knife, etc. In particular, we found that latexes of the polymers of lower alkyl acrylates, and methacrylates e.g. n-butyl acrylate and methyl methacrylate, produced by the process of this invention, had total solids contents exceeding 67 volume percent and viscosities in the range of 300 to 5,000 cps. at 25° C.

The examples which follow are intended to further illustrate the invention described herein and are not be construed as limiting the invention in any way. Unless otherwise stated, all parts and percents are by weight.

EXAMPLE 1

The apparatus used in this example consisted of a three liter resin reaction kettle immersed in a thermostatically controlled water bath, and equipped with a speed-controlled stirrer, reflux condenser, inlet tubes for monomer and surfactant solutions and a dip tube for latex withdrawal from the kettle. The stirrer was provided with three ⅜-in. by 1½-in. curved blades and was operated in the retreating mode.

The kettle was charged with 84.7 grams of water and purged with nitrogen, which entered through the dip tube and exited from the reflux condenser. During purging, the water charge was heated to 85° C. There were then added to the kettle 11.6 grams of a mixture of 1.0 gram ammonium persulfate, 0.5 gram ammonium bicarbonate and 0.1 gram Sipex UB® (30% sodium lauryl sulfate in water.) Immediately thereafter a monomers feed to the kettle was commenced at a uniform rate of 1.67 grams per minute. The monomers mixture fed to the kettle contained 70 parts methyl methacrylate, 29 parts n-butyl acrylate, and 1 part methacrylic acid. In order to obtain the uniform, low rate of feed of these monomers required during latex initiation the monomers mixture was fed by means of a syringe pump. During the monomers feed the stirrer was operated at 150 rpm. Nitrogen purging was discontinued concurrently with the beginning of the feeding of monomers and a slight positive pressure of nitrogen was applied to the condenser outlet to maintain a nitrogen atmosphere above the reactants throughout the remainder of the reaction.

Latex initiation was complete after about 2 minutes of feeding monomers, as indicated by a translucent blue appearance of the kettle contents caused by the formation of small polymer particles.

Seed Latex Formation and Latex Withdrawal

Upon completion of latex initiation the temperature of the kettle contents was reduced to 80° C., which temperature was maintained throughout the reaction. Feeding of monomers was continued as before. Using a syringe pump there was commenced a feed to the kettle of 1.48 grams per minute of an aqueous catalyst solution containing 5.61% Sipex UB ®, 0.56% ammonium persulfate, and 0.56% ammonium bicarbonate. At the same time, withdrawal of a portion of the latex from the kettle was commenced at a rate of 2.5 grams of latex per minute using a peristaltic pump. The withdrawn latex was stored in a holding tank at ambient temperature. During the entire period of latex withdrawal the withdrawn latex in the storage tank was stabilized by the continuous addition thereto, at a rate of 0.26 grams per minute. of an aqueous solution containing 49.38% Sipex UB ®, and 1.23% ammonium bicarbonate. A total of 40.5 grams of the aforementioned mixture were added to the withdrawn latex during the latex withdrawal stage.

Formation of the seed latex was continued for 1 hour during which 101.0 grams of monomers and 89.7 grams of catalyst solution were fed to the kettle. At the end of seed latex formation, it was determined by computerized material balance that the storage tank contained 160 ml. of latex having a solids content of 25.4 volume percent, while the kettle contained 135 grams of latex having a total solids content of 39.7 volume percent. (43 wt. %).

Intermediate Latex Formation and Latex Withdrawal

Upon completion of seed latex formation the rate of feed of the monomers was increased to 4 grams per minute. The previously mentioned aqueous catalyst solution feed was replaced by an aqueous catalyst solution feed containing 8.7% Sipex UB ®, 0.65% ammonium persulfate, and 0.65% ammonium bicarbonate, which was fed to the kettle at a uniform rate of 2.2 grams per minute. The monomers mixture and the aqueous catalyst solution were dripped into the kettle from graduated separatory funnels.

Intermediate latex formation was continued for 1 hour and 45 minutes, during which 420 grams of the monomers mixture and 230 grams of the aqueous catalyst solution were fed to the kettle. At the end of this period it was determined by computerized material balance that the kettle contained 523 ml. of a latex having a total solids content of 59.8 volume percent (63 wt. %) and the storage tank contained 430 ml. of a latex having a total solids content of 39.7 volume percent (43 wt. %). Stirrer speed during intermediate latex formation was increased to 180 rpm 1.5 min. after the start of intermediate latex formation.

Final Latex Formation

After completion of intermediate latex formation the peristaltic pump was reversed so that the withdrawal latex in the hold tank was fed back to the kettle. The rate of feed of withdrawn latex to the kettle was 3.5 grams/min. and monomer addition was continued at 4 grams per minute. Feeding of catalyst and surfactant to the kettle and hold tank was stopped. After 2 hours and 12 minutes of final latex formation all the withdrawn latex had been returned to the kettle. Feeding of monomers was continued for an additional 6 minutes. During the final latex formation 530 grams of monomers were fed to the kettle. Stirrer speed was increased during final latex formation to a final speed of 354 rpm to maintain efficient mixing due to increasing latex viscosity.

After conclusion of the monomers feed, the latex was neutralized by adding 8.5 ml. of 28% ammonia in water to the latex in the kettle and the reaction was allowed to continue for 1 hour at 80° C. to insure reaction of residual monomers.

The latex in the kettle was cooled and pressure filtered through a fine (180-210 mesh) nylon cloth to obtain a smooth final latex. The final latex had a total solids content of 67.8 volume percent (70.7 wt. %) a Brookfield viscosity of 3,600 centipoises (No. 3 spindle at 6 rpm). The latex withstood 15 minutes of high shear mixing with an electric food blender without coagulation.

EXAMPLE 2

The same apparatus employed in Example 1 was used in this example.

Latex Initiation

The kettle was charged with 85.3 grams of distilled water and the atmosphere was purged with nitrogen through the dip tube in a manner similar to that of Example 1. A slight positive pressure of nitrogen was then applied through the condenser outlet to maintain an inert atmosphere above the reaction mixture.

There were then charged to the kettle 10 grams of 2% aqueous solution of sulfur dioxide and 1 milligram of $Fe_2SO_4.7H_2O$ in 1 gram of water while stirring at 150 rpm. The contents of the kettle were then heated rapidly to 50° C. Feeds of a monomers mixture and a catalyst solution to the kettle were then commenced by means of separate syringe pumps. The monomers mixture contained 52 parts methyl methacrylate, 47 parts n-butyl acrylate, 1 part methacrylic acid, and 0.12 part dissolved sulfur dioxide and was fed to the kettle at a rate of 1.7 grams per minute. The catalyst solution was a 10.6% solution of ammonium persulfate and was fed at 0.16 grams per/min. After about one minute of feeding latex initiation was complete, as indicated by the appearance of a bluish translucence in the kettle contents caused by the formation of small polymer particles.

Seed Latex Formation and Latex Withdrawal

Feeding of the aformentioned catalyst solution was stopped and feeds to the kettle of a surfactant and a promoter solution were commenced. The surfactant was an aqueous solution containing 5.61% Sipex UB ® and 1.12% ammonium persulfate and was fed to the kettle at a rate of 1.45 grams per minute. The promoter, which was fed to the kettle at a rate of about 0.02 grams per minute, contained 1 milligram $Fe_2SO_4.7H_2O$ per gram of water. Withdrawal of the latex in the kettle was commenced concurrently with the feeds of surfactant and promoter, using a peristaltic pump, at a withdrawal rate of 2.5 grams per minute. The withdrawn latex was stored in a hold tank at ambient temperature. An aqueous solution of 29.3% Sipex UB ® and 4.9% ammonium persulfate was fed to the withdrawn latex in the hold tank at a rate of about 0.25 grams per minute to stabilize the emulsion.

Seed latex formation was completed after one hour, during which 101.6 grams of monomers, 86.9 grams of surfactant solution, and 1.2 ml. of promotor solution was fed to the kettle. At the completion of seed latex formation, the hold tank contained 165 ml. of withdrawn latex. The seed latex in the kettle had a total solids content of 39.6 volume percent (42.6 wt. %) and a pH of 2.1.

Intermediate Latex Formation and Latex Withdrawal

After completion of seed latex formation the feed rate of monomers was increased to 4.1 grams per minute using a graduated separatory funnel as the feeding device. The surfactant fed to the kettle in the seed latex formation step was discontinued and there was commenced a feed of an aqueous solution containing 6.44% Sipex UB ® and 0.52% ammonium persulfate from a graduated separatory funnel at a rate of 2.3 grams per minute. The rate of feed of promoter solution was adjusted to 0.02 grams per minute. Latex withdrawal and feed of surfactant to the hold tank were continued as in the seed latex formation step.

Intermediate latex formation was complete after one hour and forty-two minutes, during which there were fed to the kettle 420 grams of monomers, 230 grams of surfactant solution and 2 ml. of promotor solution. At the completion of intermediate latex formation 435 ml. of latex had been withdrawn from the kettle to the hold tank. The intermediate latex in the kettle had a total solids content of 58.7 volume percent (61.7 wt. %) and a pH of 2.0.

Final Latex Formation

After completion of intermediate latex formation the peristaltic pump was reversed so as to feed the withdrawn latex in the hold tank back to the kettle while monomer and promotor feed to the kettle continued as before. The rate of feedback was about 3.4 grams per minute. After 1 hour and 57 minutes the feeds of monomers and withdrawn latex to the kettle were stopped, all of the withdrawn latex having been returned to the kettle. During final latex formation 518 grams of monomers and 2.7 ml. of promoter solution had been added to the kettle. The stirrer speed was increased to a final speed of about 260 rpm to maintain efficient mixing as the latex viscosity increased.

The latex was neutralized with a 28% aqueous ammonia solution and maintained at 50° C. for one hour to insure reaction of any residual monomer. The final latex was then cooled and filtered through a fine (180-210 mesh) nylon cloth. The final latex had a total solids content of 67.3 volume percent (70 wt. %) and a pH of 8.7. Its Brookfield viscosity was 965 centipoises at 6 rpm and 322 centipoises at 60 rpm (No. 2 spindle at 25° C.). Viscosity, as measured on the high shear (above 15,000 reciprocal sec.) Brush-Ometer was 1.4 poises. Less than 0.1% of the final latex was scrap. The final latex withstood 15 minutes of high shear mixing with an electric food blender without coagulation.

The above examples illustrate that aqueous polymer latexes of high solids having useful viscosity can be prepared by the process of this invention and that the process is equally useful in free radical thermally initiated polymerizations (Example 1) and redox catalyzed systems (Example 2).

What is claimed is:

1. A process for producing an aqueous polymer latex having a high solids content which comprises the steps of:
    (A) initiating latex formation by feeding an emulsion polymerizable monomer to an aqueous polymerization medium containing a sufficient amount of a polymerization catalyst to initiate polymerization of the monomer; then
    (B) forming a stable seed latex by continuing to feed said emulsion polymerizable monomer to the reaction zone and simultaneously feeding to the reaction zone a polymerization catalyst and an emulsion stabilizing amount of a surfactant and buffer; then
    (C) forming an intermediate latex by continuing to feed said emulsion polymerizable monomer to the reaction zone and simultaneously feeding to the reaction zone a catalyst and an emulsion stabilizing amount of a surfactant and a buffer;
    (D) during steps (B) and (C) continuously withdrawing a portion of the latex being formed from the reaction zone to a storage zone, said steps (C) and (D) being conducted until the intermediate latex in the reaction zone has a solids content of from 55 to 65 volume percent; and then
    (E) forming a final latex by continuing to feed said emulsion polymerizable monomer to the reaction zone and simultaneously continuously feeding the withdrawn latex to the reaction zone until the desired solids content is obtained.

2. A process as claimed in claim 1, wherein step (A) is carried out with from 0 to 0.03 weight percent surfactant present in the aqueous reaction medium, based on the total amount of monomer to be fed.

3. A process as claimed in claim 1, wherein said step (C) and (D) are carried out until the latex in the reaction zone has a solids content of from 58 to 63 volume percent.

4. A process as claimed in claim 1, wherein step (E) is carried out until the final latex has a solids content of at least greater than 65 volume percent.

5. A process as claimed in claim 1, wherein said emulsion polymerizable monomer contains a lower alkyl acrylate or methacrylate.

6. The aqueous polymer latex which is produced by the process of claim 1.

7. The aqueous polymer latex which is produced by the process of claim 2.

8. The aqueous polymer latex which is produced by the process of claim 3.

9. The aqueous polymer latex which is produced by the process of claim 4.

10. The aqueous polymer latex which is produced by the process of claim 5.

11. A process as claimed in claim 1, wherein, during the formation of the stable seed latex in step (B), the emulsion polymerizable monomer is fed to the reaction zone at a rate equal to or less than 0.5 weight percent of the total monomer feed per minute.

12. A process as claimed in claim 1, wherein, during the formation of the stable seed latex in step (B), the emulsion polymerizable monomer is fed to the reaction zone at a rate equal to or less than 0.25 weight percent of the total monomer feed per minute.

13. The aqueous polymer latex which is produced by the process of claim 11.

14. The aqueous polymer latex which is produced by the process of claim 12.

* * * * *